US010482584B1

(12) United States Patent
Kim et al.

(10) Patent No.: US 10,482,584 B1
(45) Date of Patent: Nov. 19, 2019

(54) LEARNING METHOD AND LEARNING DEVICE FOR REMOVING JITTERING ON VIDEO ACQUIRED THROUGH SHAKING CAMERA BY USING A PLURALITY OF NEURAL NETWORKS FOR FAULT TOLERANCE AND FLUCTUATION ROBUSTNESS IN EXTREME SITUATIONS, AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/262,996

(22) Filed: Jan. 31, 2019

(51) Int. Cl.
  *G06T 5/00* (2006.01)
  *G06T 7/246* (2017.01)
  (Continued)

(52) U.S. Cl.
  CPC ............. *G06T 5/003* (2013.01); *G06F 17/11* (2013.01); *G06K 9/3233* (2013.01);
  (Continued)

(58) Field of Classification Search
  CPC .... G06F 17/11; G06K 9/3233; G06N 3/0454; G06N 3/084; G06T 5/003; G06T 7/248;
  (Continued)

(56) References Cited

U.S. PATENT DOCUMENTS

| | | | |
|---|---|---|---|
| 2015/0097976 A1* | 4/2015 | Nakanishi | H04N 5/145 348/208.1 |
| 2017/0186176 A1* | 6/2017 | Paluri | G06K 9/6212 |

(Continued)

OTHER PUBLICATIONS

He et al. ("Mask R-CNN," IEEE International Conference on Computer Vision, Oct. 22-29, 2017) (Year: 2017).*

(Continued)

Primary Examiner — Yubin Hung
(74) Attorney, Agent, or Firm — Xsensus LLP

(57) ABSTRACT

A method for detecting jittering in videos generated by a shaken camera to remove the jittering on the videos using neural networks is provided for fault tolerance and fluctuation robustness in extreme situations. The method includes steps of: a computing device, generating each of t-th masks corresponding to each of objects in a t-th image; generating each of t-th object motion vectors of each of object pixels, included in the t-th image by applying at least one 2-nd neural network operation to each of the t-th masks, each of t-th cropped images, each of (t−1)-th masks, and each of (t−1)-th cropped images; and generating each of t-th jittering vectors corresponding to each of reference pixels among pixels in the t-th image by referring to each of the t-th object motion vectors. Thus, the method is used for video stabilization, object tracking with high precision, behavior estimation, motion decomposition, etc.

26 Claims, 4 Drawing Sheets

(51) Int. Cl.
*G06N 3/04* (2006.01)
*G06N 7/08* (2006.01)
*G06N 3/08* (2006.01)
*G06F 17/11* (2006.01)
*G06K 9/32* (2006.01)

(52) U.S. Cl.
CPC ........... *G06N 3/0454* (2013.01); *G06N 3/084* (2013.01); *G06T 7/248* (2017.01); *G06T 2207/10016* (2013.01); *G06T 2207/20081* (2013.01); *G06T 2207/20084* (2013.01)

(58) Field of Classification Search
CPC . G06T 2207/10016; G06T 2207/20081; G06T 2207/20084
See application file for complete search history.

(56) References Cited

U.S. PATENT DOCUMENTS

| | | | |
|---|---|---|---|
| 2018/0174291 A1* | 6/2018 | Asada | G06T 7/0004 |
| 2018/0181864 A1* | 6/2018 | Mathew | G06N 3/0454 |
| 2018/0365496 A1* | 12/2018 | Hovden | G06T 17/00 |
| 2019/0065903 A1* | 2/2019 | Wang | G06K 9/6257 |

OTHER PUBLICATIONS

Lall et al. ("A Mask Regional Convolutional Neural Network Model for Segmenting Real Time Traffic Images," 9th International Conference on Computing, Communication and Networking Technologies, Jul. 10-12, 2018) (Year: 2018).*

Dosovitsiy et al. ("FlowNet: Learning Optical Flow with Convolutional Networks," IEEE International Conference on Computer Vision, Dec. 7-13, 2015) (Year: 2015).*

Pobar et al. ("Mask R-CNN and Optical Flow Based Method for Detection and Marking of Handball Actions," 11th International Congress on Image and Signal Processing, BioMedical Engineering and Informatics, Oct. 13-15, 2018) (Year: 2018).*

Le et al. ("Efficient Human-Robot Interaction using Deep Learning with Mask R-CNN: Detection, Recognition, Tracking and Segmentation," 15th International Conference on Control, Automation, Robotics and Vision, Nov. 18-21, 2018) (Year: 2018).*

* cited by examiner

LEARNING METHOD AND LEARNING DEVICE FOR REMOVING JITTERING ON VIDEO ACQUIRED THROUGH SHAKING CAMERA BY USING A PLURALITY OF NEURAL NETWORKS FOR FAULT TOLERANCE AND FLUCTUATION ROBUSTNESS IN EXTREME SITUATIONS, AND TESTING METHOD AND TESTING DEVICE USING THE SAME

FIELD OF THE DISCLOSURE

The present disclosure relates to a learning method and a learning device for use with an autonomous vehicle; and more particularly, to the learning method and the learning device for detecting jittering in videos generated by a shaking camera to remove the jittering on the videos using one or more neural networks, and a testing method and a testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the convolutional neural network became a very useful tool in the field of the machine learning.

The CNNs are widely used in a field of autonomous driving and they detect obstacles by analyzing images obtained through a camera attached to a vehicle, and detect free space, etc., so that the vehicle can be safely driven.

However, a method of allowing the autonomous driving of the vehicle using the CNNs as described above may be difficult to perform in a specific situation. In other words, the CNNs must use the images obtained through the camera, but if the images are shaken due to a camera shake or the like, then a jittering effect occurs in which the images change greatly for each frame of the images. If such jittering occurs, the CNNs cannot track the movement of objects on the images easily. Especially, this jittering effect occurs very frequently in the autonomous driving of military vehicles which frequently travel off-road, and a method for preventing this is very important.

As a conventional technique for preventing such jittering, there is a method of physically correcting the jittered images by measuring the movement of the camera, but, in this case, the weight of the camera module is increased, the cost thereof is expensive, and use of multiple devices increases the risk of malfunction. Although a software technique rather than the above-mentioned physical technique exists as a conventional technique, it takes into consideration only the optical flow of an object of an image, which causes a problem of generating a large image distortion in the process of correcting the image in which jittering occurs.

SUMMARY OF THE DISCLOSURE

It is an object of the present disclosure to solve all the aforementioned problems.

It is another object of the present disclosure to acquire decent images from a shaking camera by correcting images with jittering through multiple neural networks.

In accordance with one aspect of the present disclosure, there is provided a method for detecting jittering in videos generated by a shaking camera to remove the jittering on the videos using one or more neural networks, including steps of: (a) a computing device, if a t-th image corresponding to a t-th frame on the videos is acquired, instructing a 1-st neural network to generate each of t-th masks corresponding to each of objects in the t-th image by applying at least one 1-st neural network operation to the t-th image; (b) the computing device instructing a 2-nd neural network to generate each of t-th object motion vectors of each of object pixels, corresponding to each of the objects, included in the t-th image by applying at least one 2-nd neural network operation to (i) each of the t-th masks, (ii) each of t-th cropped images, corresponding to each of the t-th masks, which are part of the t-th image, (iii) each of (t−1)-th masks, and (iv) each of (t−1)-th cropped images, corresponding to each of the (t−1)-th masks, which are part of a (t−1)-th image; and (c) the computing device instructing a jittering estimation unit to generate each of t-th jittering vectors corresponding to each of reference pixels among pixels in the t-th image by referring to each of the t-th object motion vectors.

As one example, the method further includes a step of: (d) the computing device instructing the jittering estimation unit to generate a t-th adjusted image in which jittering of the t-th image is smoothed by referring to the t-th jittering vectors.

As one example, the method further includes a step of: (e) the computing device instructing a learning unit to calculate one or more losses by referring to (i) t-th adjusted object motion vectors optimized through a process for generating the t-th jittering vectors and (ii) the t-th object motion vectors before the optimization, and to learn at least part of one or more parameters of the 2-nd neural network by backpropagating the losses.

As one example, at the step of (c), the computing device instructs the jittering estimation unit to generate the t-th jittering vectors by further referring to (i) each of t-th optical flow vectors representing a degree of movement of each of positions corresponding to each of pixels in the t-th image between a point of time when the (t−1)-th image is taken and a point of time when the t-th image is taken by the camera and (ii) each of t-th FPV vectors representing a degree of movement of each of the positions in a three dimensional space between a point of time when the (t−1)-th image is taken and a point of time when the t-th image is taken by the camera.

As one example, at the step of (d), the computing device instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \lambda_v \sum_{i,j} \|v_{ij}^{(t)} - v_{ij}^{(t-1)}\|_F^2 + \lambda_o \sum_{x,y} \|o_{xy}^{(t)} - o_{xy}^{(t-1)}\|_F^2,$$

to thereby generate the t-th jittering vectors, wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t)}$ is (t−1)-th FPV vectors, $o_{xy}^{(t)}$ is (t−1)-th object motion vectors, $\lambda_v$ and $\lambda_o$ are each of weights of $\Sigma_{i,j}\|v_{ij}^{(t)} - v_{ij}^{(t-1)}\|_F^2$ and $\Sigma_{x,y}\|o_{xy}^{(t)} - o_{xy}^{(t-1)}\|_F^2$ respectively.

As one example, the formula is valid for terms satisfying $$f_{ij}^{(t)} = o_{ij}^{(t)} + v_{ij}^{(t)} + e_{ij}^{(t)}, \quad f_{xy}^{(t)} = o_{xy}^{(t)} + \sum_{i,j \in NB(x,y)} w_{ij,xy}(v_{ij}^{(t)} + e_{ij}^{(t)})$$

wherein $f_{ij}^{(t)}$ is first t-th optical flow vectors, which are part of the t-th optical flow vectors, of the reference pixels, $f_{xy}^{(t)}$ is second t-th optical flow vectors of pixels other than the reference pixels, $o_{ij}^{(t)}$ is t-th object motion vectors, which are part of the t-th object motion vectors, of specific pixels which are the object pixels and also the reference pixels, $i,j \in NB(x,y)$ at a bottom of a sigma symbol represents that information on part of the reference pixels in a grid including a certain pixel is used, and $w_{ij,xy}$ is each of weights according to at least one location of the certain pixel in the grid.

As one example, the computing device instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \frac{1}{\sum_{k=1,\ldots,K} w_k} \sum_{k=1,\ldots,K} w_k |v_{ij}^{(t)} - v_{ij}^{(t-k)}|^2 +$$

$$\frac{1}{\sum_{k=1,\ldots,K} w_k} \sum_{k=1,\ldots,K} w_k |o_{xy}^{(t)} - o_{xy}^{(t-k)}|^2$$

wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-k)}$ is (t-k)-th FPV vectors of a (t-k)-th image, $o_{xy}^{(t-k)}$ is (t-k)-th object motion vectors of the (t-k)-th image, $w_k$ is weights of $|v_{ij}^{(t)} - v_{ij}^{(t-k)}|^2$ and $|o_{xy}^{(t)} - o_{xy}^{(t-k)}|^2$, K is a certain constant.

As one example, at the step of (b), the 2-nd neural network includes a (2_1)-st neural network and a (2_2)-nd neural network, wherein the (2_1)-st neural network generates at least one intermediate feature map by performing at least one (2_1)-st neural network operation, included in the 2-nd neural network operation, which analyzes each of the t-th masks, each of the t-th cropped images, each of the (t−1)-th masks and each of the (t_1)-st cropped images, and wherein the (2_2)-nd neural network generates the t-th object motion vectors by applying at least one (2_2)-nd neural network operation included in the 2-nd neural network operation to the intermediate feature map by referring to analysis of values inputted before acquiring the t-th image.

As one example, the (2_2)-nd neural network generates the t-th object motion vectors using its stored state vectors, by reflecting the analysis of values, generated by the (2_1)-st neural network, on at least part of a 1-st image to the (t−1)-th image and updates the state vectors.

As one example, the reference pixels are vertices disposed on boundaries of a grid cell of the grid on the t-th image.

As one example, at the step of (a), the 1-st neural network includes at least one Region Proposal Network, at least one convolutional layer, at least one pooling layer, and, if the Region Proposal Network generates at least one ROI, the 1-st neural network selects at least one region, corresponding to the ROI, on the t-th image by a bilinear interpolation and generates the t-th masks by applying at least one operation of the convolutional layer to said at least one region.

In accordance with another aspect of the present disclosure, there is provided a testing method for removing jittering in videos for testing generated by a shaking camera to remove the jittering on the videos for testing using one or more neural networks, including steps of: (a) a testing device, on condition that a learning device has performed processes of (1) after acquiring a t-th image for training corresponding to a t-th frame for training on videos for training, instructing a 1-st neural network to generate each of t-th masks for training corresponding to each of objects for training in the t-th image for training by applying at least one 1-st neural network operation to the t-th image for training, (2) instructing a 2-nd neural network to generate each of t-th object motion vectors for training of each of object pixels for training, corresponding to each of the objects for training, included in the t-th image for training by applying at least one 2-nd neural network operation to (i) each of the t-th masks for training, (ii) each of t-th cropped images for training, corresponding to each of the t-th masks for training, which are part of the t-th image for training, (iii) each of (t−1)-th masks for training, and (iv) each of (t−1)-th cropped images for training, corresponding to each of the (t−1)-th masks for training, which are part of a (t−1)-th image for training, (3) instructing a jittering estimation unit to generate each of t-th jittering vectors for training corresponding to each of reference pixels for training among pixels in the t-th image for training by referring to each of the t-th object motion vectors for training, and (4) instructing a learning unit to calculate one or more losses by referring to (i) t-th adjusted object motion vectors for training optimized through a process for generating the t-th jittering vectors for training and (ii) the t-th object motion vectors for training before the optimization, and to learn at least part of one or more parameters of the 2-nd neural network by backpropagating the losses, if a t-th image for testing corresponding to a t-th frame for testing on the videos for testing is acquired, instructing the 1-st neural network to generate each of t-th masks for testing corresponding to each of objects for testing in the t-th image for testing by applying the 1-st neural network operation to the t-th image for testing; (b) the testing device instructing the 2-nd neural network to generate each of t-th object motion vectors for testing of each of object pixels for testing, corresponding to each of the objects for testing, included in the t-th image for testing by applying the 2-nd neural network operation to (i) each of the t-th masks for testing, (ii) each of t-th cropped images for testing, corresponding to each of the t-th masks for testing, which are part of the t-th image for testing, (iii) each of (t−1)-th masks for testing, and (iv) each of (t−1)-th cropped images for testing, corresponding to each of the (t−1)-th masks for testing, which are part of a (t−1)-th image for testing; and (c) the testing device instructing the jittering estimation unit to generate each of t-th jittering vectors for testing corresponding to each of reference pixels for testing among pixels in the t-th image for testing by referring to each of the t-th object motion vectors for testing.

As one example, the testing method further includes a step of: (d) the testing device instructing the jittering estimation unit to generate a t-th adjusted image for testing in which jittering of the t-th image for testing is smoothed by referring to the t-th jittering vectors for testing.

In accordance with still another aspect of the present disclosure, there is provided a computing device for detecting jittering in videos generated by a shaking camera to remove the jittering on the videos using one or more neural networks, including: at least one memory that stores instructions; and at least one processor configured to execute the instructions to: perform processes of: (I) if a t-th image corresponding to a t-th frame on the videos is acquired, instructing a 1-st neural network to generate each of t-th masks corresponding to each of objects in the t-th image by applying at least one 1-st neural network operation to the t-th image, (II) instructing a 2-nd neural network to generate each of t-th object motion vectors of each of object pixels, corresponding to each of the objects, included in the t-th image by applying at least one 2-nd neural network operation to (i) each of the t-th masks, (ii) each of t-th cropped images, corresponding to each of the t-th masks, which are part of the t-th image, (iii) each of (t−1)-th masks, and (iv) each of (t−1)-th cropped images, corresponding to each of the (t−1)-th masks, which are part of a (t−1)-th image, and (III) instructing a jittering estimation unit to generate each of t-th jittering vectors corresponding to each of reference pixels among pixels in the t-th image by referring to each of the t-th object motion vectors.

As one example, the processor further performs a process of: (IV) instructing the jittering estimation unit to generate a t-th adjusted image in which jittering of the t-th image is smoothed by referring to the t-th jittering vectors.

As one example, the processor further performs a process of: (V) instructing a learning unit to calculate one or more losses by referring to (i) t-th adjusted object motion vectors optimized through a process for generating the t-th jittering vectors and (ii) the t-th object motion vectors before the optimization, and to learn at least part of one or more parameters of the 2-nd neural network by backpropagating the losses.

As one example, at the process of (III), the processor instructs the jittering estimation unit to generate the t-th jittering vectors by further referring to (i) each of t-th optical flow vectors representing a degree of movement of each of positions corresponding to each of pixels in the t-th image between a point of time when the (t−1)-th image is taken and a point of time when the t-th image is taken by the camera and (ii) each of t-th FPV vectors representing a degree of movement of each of the positions in a three dimensional space between a point of time when the (t−1)-th image is taken and a point of time when the t-th image is taken by the camera.

As one example, at the process of (IV), the processor instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \lambda_v \sum_{i,j} \|v_{ij}^{(t)} - v_{ij}^{(t-1)}\|_F^2 + \lambda_o \sum_{x,y} \|o_{xy}^{(t)} - o_{xy}^{(t-1)}\|_F^2,$$

to thereby generate the t-th jittering vectors, wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-1)}$ is (t−1)-th FPV vectors, $o_{xy}^{(t-1)}$ is (t−1)-th object motion vectors, $\lambda_v$ and $\lambda_o$ are each of weights $\Sigma_{i,j}\|v_{ij}^{(t)} - v_{ij}^{(t-1)}\|_F^2$ and $\Sigma_{x,y}\|o_{xy}^{(t)} - o_{xy}^{(t-1)}\|_F^2$ respectively.

As one example, the formula is valid for terms satisfying $$f_{ij}^{(t)} = o_{ij}^{(t)} + v_{ij}^{(t)} + e_{ij}^{(t)},\ f_{xy}^{(t)} = o_{xy}^{(t)} + \sum_{i,j \in NB(x,y)} w_{ij,xy}(v_{ij}^{(t)} + e_{ij}^{(t)})$$

wherein $f_{ij}^{(t)}$ is first t-th optical flow vectors, which are part of the t-th optical flow vectors, of the reference pixels, $f_{xy}^{(t)}$ is second t-th optical flow vectors of pixels other than the reference pixels, $o_{ij}^{(t)}$ is t-th object motion vectors, which are part of the t-th object motion vectors, of specific pixels which are the object pixels and also the reference pixels, $i,j \in NB(x,y)$ at a bottom of a sigma symbol represents that information on part of the reference pixels in a grid including a certain pixel is used, and $w_{ij,xy}$ is each of weights according to at least one location of the certain pixel in the grid.

As one example, the processor instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \frac{1}{\sum_{k=1,\ldots,K} w_k} \sum_{k=1,\ldots,K} w_k |v_{ij}^{(t)} - v_{ij}^{(t-k)}|^2 +$$

$$\frac{1}{\sum_{k=1,\ldots,K} w_k} \sum_{k=1,\ldots,K} w_k |o_{xy}^{(t)} - o_{xy}^{(t-k)}|^2$$

wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-k)}$ is (t−k)-th FPV vectors of a (t−k)-th image, $o_{xy}^{(t-k)}$ is (t−k)-th object motion vectors of the (t−k)-th image, $w_k$ is weights of $|v_{ij}^{(t)} - v_{ij}^{(t-k)}|^2$ and $|o_{xy}^{(t)} - o_{xy}^{(t-k)}|^2$, K is a certain constant.

As one example, at the process of (II), the 2-nd neural network includes a (2_1)-st neural network and a (2_2)-nd neural network, wherein the (2_1)-st neural network generates at least one intermediate feature map by performing at least one (2_1)-st neural network operation, included in the 2-nd neural network operation, which analyzes each of the t-th masks, each of the t-th cropped images, each of the (t−1)-th masks and each of the (t_1)-st cropped images, and wherein the (2_2)-nd neural network generates the t-th object motion vectors by applying at least one (2_2)-nd neural network operation included in the 2-nd neural network operation to the intermediate feature map by referring to analysis of values inputted before acquiring the t-th image.

As one example, the (2_2)-nd neural network generates the t-th object motion vectors using its stored state vectors, by reflecting the analysis of values, generated by the (2_1)-st neural network, on at least part of a 1-st image to the (t−1)-th image and updates the state vectors.

As one example, the reference pixels are vertices disposed on boundaries of a grid cell of the grid on the t-th image.

As one example, at the process of (I), the 1-st neural network includes at least one Region Proposal Network, at least one convolutional layer, at least one pooling layer, and, if the Region Proposal Network generates at least one ROI, the 1-st neural network selects at least one region, corresponding to the ROI, on the t-th image by a bilinear interpolation and generates the t-th masks by applying at least one operation of the convolutional layer to said at least one region.

In accordance with still yet another aspect of the present disclosure, there is provided a testing device for removing jittering in videos for testing generated by a shaking camera to remove the jittering on the videos for testing using one or more neural networks, including: at least one memory that stores instructions; and at least one processor, on condition that a learning device has performed processes of (1) after acquiring a t-th image for training corresponding to a t-th frame for training on videos for training, instructing a 1-st neural network to generate each of t-th masks for training corresponding to each of objects for training in the t-th image for training by applying at least one 1-st neural network operation to the t-th image for training, (2) instructing a 2-nd neural network to generate each of t-th object motion vectors for training of each of object pixels for training, corresponding to each of the objects for training, included in the t-th image for training by applying at least one 2-nd neural network operation to (i) each of the t-th masks for training, (ii) each of t-th cropped images for training, corresponding to each of the t-th masks for training, which are part of the t-th image for training, (iii) each of (t−1)-th masks for training, and (iv) each of (t−1)-th cropped images for training, corresponding to each of the (t−1)-th masks for training, which are part of a (t−1)-th image for training, (3) instructing a jittering estimation unit to generate each of t-th jittering vectors for training corresponding to each of reference pixels for training among pixels in the t-th image for training by referring to each of the t-th object motion vectors for training, and (4) instructing a learning unit to calculate one or more losses by referring to (i) t-th adjusted object motion vectors for training optimized through a process for generating the t-th jittering vectors for training and (ii) the t-th object motion vectors for training before the optimization, and to learn at least part of one or more parameters of the 2-nd neural network by backpropagating the losses; configured to execute the instructions to: perform processes of: (I) if a t-th image for testing corresponding to a t-th frame for testing on the videos for testing is acquired, instructing the 1-st neural network to generate each of t-th masks for testing corresponding to each of objects for testing in the t-th image for testing by applying the 1-st neural network operation to the t-th image for testing, (II) instructing the 2-nd neural network to generate each of t-th object motion vectors for testing of each of object pixels for testing, corresponding to each of the objects for testing, included in the t-th image for testing by applying the 2-nd neural network operation to (i) each of the t-th masks for testing, (ii) each of t-th cropped images for testing, corresponding to each of the t-th masks for testing, which are part of the t-th image for testing, (iii) each of (t−1)-th masks for testing, and (iv) each of (t−1)-th cropped images for testing, corresponding to each of the (t−1)-th masks for testing, which are part of a (t−1)-th image for testing, and (III) instructing the jittering estimation unit to generate each of t-th jittering vectors for testing corresponding to each of reference pixels for testing among pixels in the t-th image for testing by referring to each of the t-th object motion vectors for testing.

As one example, the processor further performs a process of: (IV) instructing the jittering estimation unit to generate a t-th adjusted image for testing in which jittering of the t-th image for testing is smoothed by referring to the t-th jittering vectors for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Figure 1:
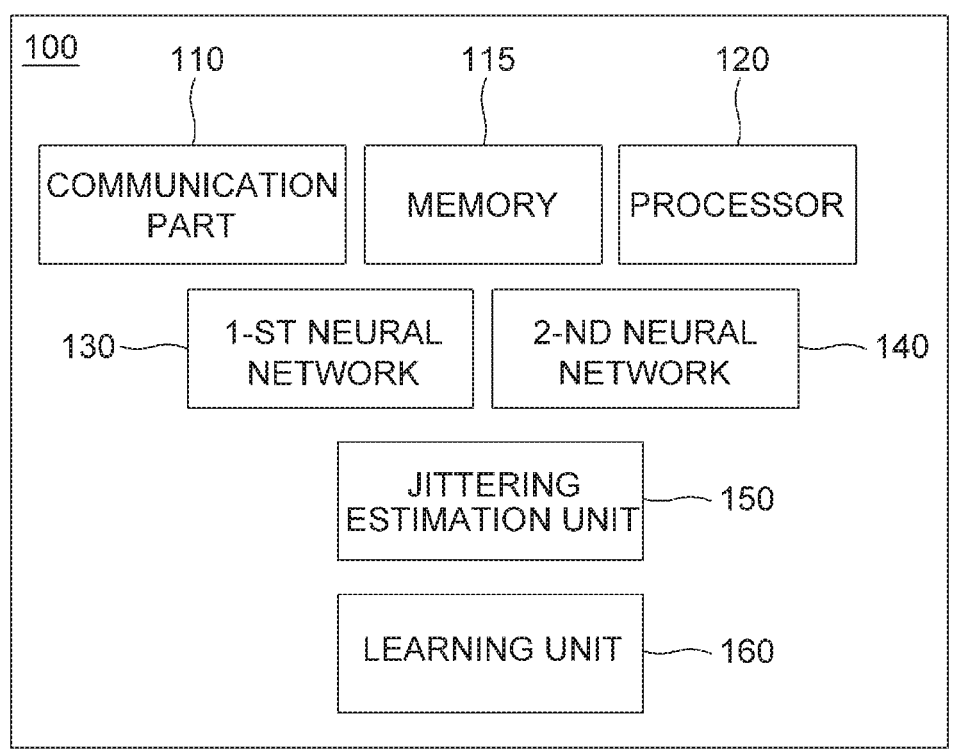
FIG. 1 is a drawing schematically illustrating a configuration of a computing device performing a method for removing jittering from videos using multiple neural networks in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached drawings will be explained in detail as shown below.

FIG. 1 is a drawing schematically illustrating a configuration of a computing device performing a method for removing jittering from videos using multiple neural networks in accordance with one example embodiment of the present disclosure.

By referring to FIG. 1, the computing device 100 may include a 1-st neural network 130, a 2-nd neural network 140, a jittering estimation unit 150, and a learning unit 160, which are components to be described later. Processes of input, output and computation of the 1-st neural network 130, the 2-nd neural network 140, the jittering estimation unit 150, and the learning unit 160 may be respectively performed by a communication part 110 and a processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

A general configuration of the computing device 100 is described above, and a method performed by the computing device 100 for removing jittering on the videos using the multiple neural networks is described below.

Figure 2:
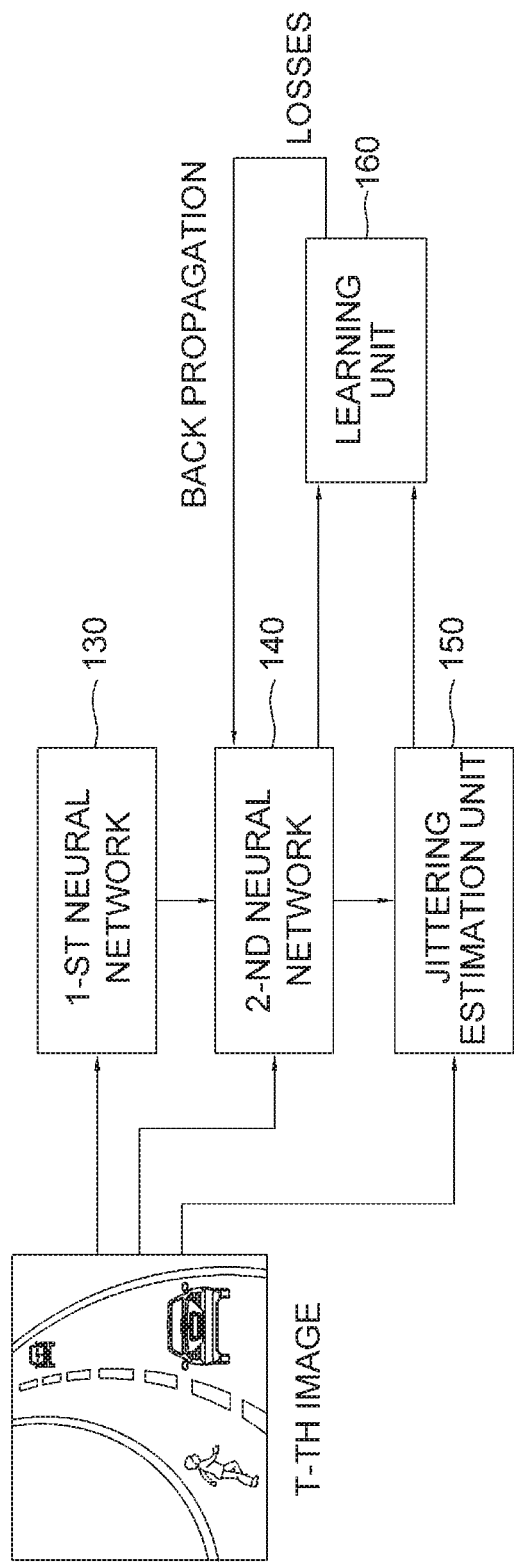
FIG. 2 is a drawing schematically illustrating a process of learning a method for removing jittering from the videos using the multiple neural networks in accordance with one example embodiment of the present disclosure.

FIG. 2 is a drawing schematically illustrating a process of learning a method for removing jittering from the videos using the multiple neural networks in accordance with one example embodiment of the present disclosure.

By referring to FIG. 2, operations may be performed sequentially by the 1-st neural network 130, the 2-nd neural network 140, and the jittering estimation unit 150. The learning unit 160 may calculate one or more losses by using a result of the operations, may backpropagate the losses, and may learn at least part of one or more parameters of the 2-nd neural network 140.

Specifically, first of all, the computing device 100 may acquire or support another device to acquire a t-th image. The t-th image may be a t-th frame on the videos when a camera is shaken and, as a result, jittering of the videos occurs. Meanwhile, a method in accordance with one example of the present disclosure applies to a case when the jittering occurs due to a camera shake, and because any effect of the camera shake appears after a first frame of the videos, the description below supposes that t is equal to or greater than 2. The acquired t-th image may be inputted into the 1-st neural network 130. The computing device 100 may instruct the 1-st neural network 130 to generate each of t-th masks corresponding to each of objects in the t-th image by applying at least one 1-st neural network operation to the t-th image.

The t-th masks may result from applying object detection and image segmentation to the t-th image through the 1-st neural network 130. Specifically, the 1-st neural network 130 may include at least one Region Proposal Network, i.e., RPN, at least one convolutional layer, and at least one pooling layer. Herein, if the RPN generates at least one ROI, the 1-st neural network may select at least one region, corresponding to the ROI, on the t-th image by a bilinear interpolation and may generate the t-th masks by applying at least one operation of the convolutional layer to said at least one region. As such, each of the t-th masks may be each of bounding boxes including each of the objects on the t-th image, and may have a configuration that pixels corresponding to the object are set as 1 and pixels not corresponding to the object are set as 0.

Herein, for example, the 1-st neural network 130 may have a structure similar to that of a mask R-CNN widely known. Also, the 1-st neural network 130 may have learned a method as above of generating the t-th masks, before a learning process in accordance with one example of the present disclosure is performed.

Thereafter, the computing device 100 may instruct the 2-nd neural network to acquire (i) each of the t-th masks, (ii) each of t-th cropped images, corresponding to each of the t-th masks, (iii) each of (t−1)-th masks, and (iv) each of (t−1)-th cropped images, corresponding to each of the (t−1)-th masks, where (iii) and (iv) are of a (t−1)-th image corresponding to a (t−1)-th frame which is a previous frame of the t-th frame. The t-th cropped images may be images corresponding to part of the t-th image, the part also corresponding to the t-th masks. Also, the (t−1)-th masks and the (t−1)-th cropped images may have been generated when the 2-nd neural network 140 has processed the (t−1)-th image.

If each of the t-th masks, each of the t-th cropped images, each of the (t−1)-th masks, and each of (t−1)-th cropped images are acquired, the computing device 100 may instruct the 2-nd neural network 140 to generate each of t-th object motion vectors by applying at least one 2-nd neural network operation to each of the t-th masks, each of the t-th cropped images, each of the (t−1)-th masks, and each of (t−1)-th cropped images.

Each of the t-th object motion vectors may represent a degree of movement of each of the objects between a point of time when the (t−1)-th image is taken and a point of time when the t-th image is taken by the camera. That is, if a specific object corresponding to a specific (t−1)-th mask and a specific t-th mask exists, the 2-nd neural network 140 may (i) acquire comparison information between a location of a specific object pixel, corresponding to a specific object, on the specific (t−1)-th mask and a location thereof on the specific t-th mask, (ii) acquire change information on a change of a background by comparing a specific (t−1)-th cropped image and a specific t-th cropped image, and (iii) generate a specific t-th object motion vector representing a degree of movement of the specific object between the point of time when the (t−1)-th image is taken and the point of time when the t-th image is taken, by referring to the comparison information and the change information.

Herein, the 2-nd neural network 140 may have a configuration of a single CNN and its 2-nd neural network operation may include at least one convolution operation and additional operations. However, for efficient and better results even with limited resources, the 2-nd neural network 140 may include a (2_1)-st neural network and a (2_2)-nd neural network. This is explained by referring to FIG. 3.

Figure 3:
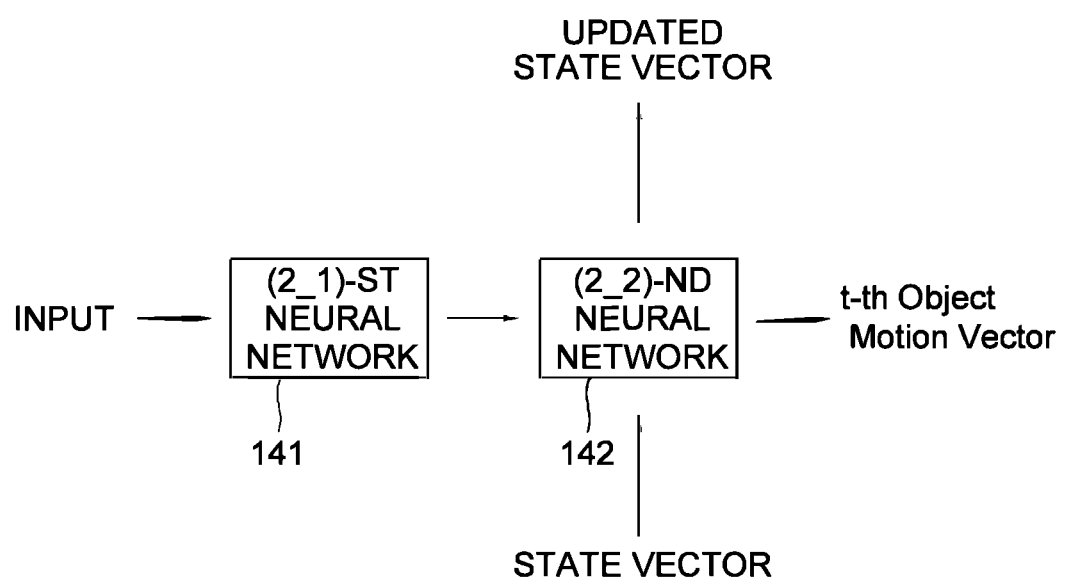
FIG. 3 is a drawing schematically illustrating an exemplary configuration of a 2-nd neural network for removing jittering from the videos using the multiple neural networks in accordance with one example embodiment of the present disclosure.

FIG. 3 is a drawing schematically illustrating an exemplary configuration of the 2-nd neural network for removing jittering from the videos using the multiple neural networks in accordance with one example embodiment of the present disclosure.

By referring to FIG. 3, the t-th jittering vectors are generated by sequential operations of the (2_1)-st neural network 141 and the (2_2)-nd neural network 142.

Specifically, the (2_1)-st neural network 141 may have a configuration of the CNN, and may generate at least one intermediate feature map, including a result of analysis on inputted values, by applying at least one (2_1)-st neural network operation including the convolution operation to each of the t-th masks, each of the t-th cropped images, each of the (t−1)-th masks and each of the (t_1)-st cropped images. Thereafter, the (2_2)-nd neural network 142 with a configuration of an RNN may acquire the intermediate feature map and may generate the t-th object motion vectors via applying the (2_2)-nd neural network operation to the intermediate feature map by referring to the result of analysis on the inputted values. The result of analysis may include a result of the analysis on the values inputted into the (2_2)-nd neural network 142 before acquiring the t-th image. This process is performed through the (2_2)-nd neural network 142 by referring to state vectors updated every time the (2_2)-nd neural network 142 processes its inputted values when the (2_2)-nd neural network operation is performed. Herein, more specifically, the state vectors may represent statuses of previous inputs of the (2_2)-nd neural network, and may be inputted to the (2_2)-nd neural network 142 when it processes the current inputs. For example, a specific state vector $s_{t-1}$ may be inputted to the (2_2)-nd neural network 142 when it processes its input to generate the t-th object motion vector. The specific state vector $s_{t-1}$ may have been updated while the neural network 142 has generated the (t−1)-th object motion vector, to represent a specific status of its input for generating the (t−1)-th object motion vector.

Thereafter, the computing device 100 may instruct the jittering estimation unit 150 to generate t-th jittering vectors by referring to the t-th object motion vectors. The losses to be used for learning at least part of the parameters of the 2-nd neural network 140 may be calculated during this process, and its details are described below.

Specifically, the computing device 100 may instruct the jittering estimation unit 150 to generate the t-th jittering vectors corresponding to reference pixels among pixels included in the t-th image by referring to the t-th object motion vectors. The reference pixels are vertices disposed on boundaries of at least one grid cell of a grid generated on the t-th image. In practice, if a degree of jittering is calculated for every pixel in the t-th image, its computational load becomes too heavy and may cause delay in autonomous driving where real-timeness is a critical factor, therefore the grid for partitioning the t-th image is used, and jittering of pixels that are vertices of the grid cell is calculated, and the t-th jittering vectors related to the t-th image are generated. That is, the t-th jittering vectors may be a result of tracking jittering of the reference pixels that can represent each pixel in the t-th image, and may be indicators of an amplitude and a direction of jittering of the camera.

To generate the t-th jittering vectors, the computing device 100 may instruct the jittering estimation unit 150 to process an optimization of the t-th object motion vectors by additionally referring to t-th optical flow vectors and t-th FPV vectors, as described below.

First, (i) each of the t-th optical flow vectors may represent a degree of movement of each of positions corresponding to each of pixels in the t-th image between the point of time when the (t−1)-th image is taken and the point of time when the t-th image is taken by the camera and (ii) each of the t-th FPV vectors may represent a degree of movement of each of the positions in a three dimensional space between the point of time when the (t−1)-th image is taken and the point of time when the t-th image is taken. Herein, the t-th optical flow vectors may be calculated exactly by comparing the (t−1)-th image and the t-th image through a Lucas-Kanade method, as opposed to other vectors aforementioned which are estimated. That is, these are constants, not changed by the process of the optimization described below. Also, the t-th jittering vectors and the t-th FPV vectors may be calculated for the reference pixels, and the t-th object motion vectors may be set as 0 for pixels other than object pixels determined as corresponding to the object in the t-th image.

For the optimization, the t-th optical flow vectors, the t-th FPV vectors, the t-th object motion vectors, and the t-th jittering vectors may be assumed to have relations expressed as two formulas below.

$$f_{ij}^{(t)} = o_{ij}^{(t)} + v_{ij}^{(t)} + e_{ij}^{(t)}, \; f_{xy}^{(t)} = o_{xy}^{(t)} + \sum_{i,j \in NB(x,y)} w_{ij,xy}(v_{ij}^{(t)} + e_{ij}^{(t)})$$

The formula above may represent an assumption that each of the measured t-th optical flow vectors is basically each of sums of each of the t-th FPV vectors, each of the t-th object motion vectors, and each of the t-th jittering vectors. Specifically, among terms in the left formula, $f_{ij}^{(t)}$ may be first t-th optical flow vectors of the reference pixels, $o_{ij}^{(t)}$ may be the t-th object motion vectors of specific pixels which are the object pixels and also the reference pixels, $v_{ij}^{(t)}$ may be the t-th FPV vectors, and $e_{ij}^{(t)}$ may be the t-th jittering vectors.

The first t-th optical flow vectors of the reference pixels may be modeled as a sum of vectors as the left formula, but second t-th optical flow vectors of pixels other than the reference pixels may be modeled as a weighted sum of the t-th FPV vectors and the t-th jittering vectors of the reference pixels nearby. $f_{xy}^{(t)}$ may be the second t-th optical flow vectors of the pixels other than the reference pixels, $o_{xy}^{(t)}$ may be the t-th object motion vectors of the pixels other than the reference pixels, and a sigma symbol may be the weighted sum of the t-th FPV vectors and the t-th jittering vectors of part of the reference pixels that compose the grid. This is described taking an example by referring to FIG. 4.

Figure 4:
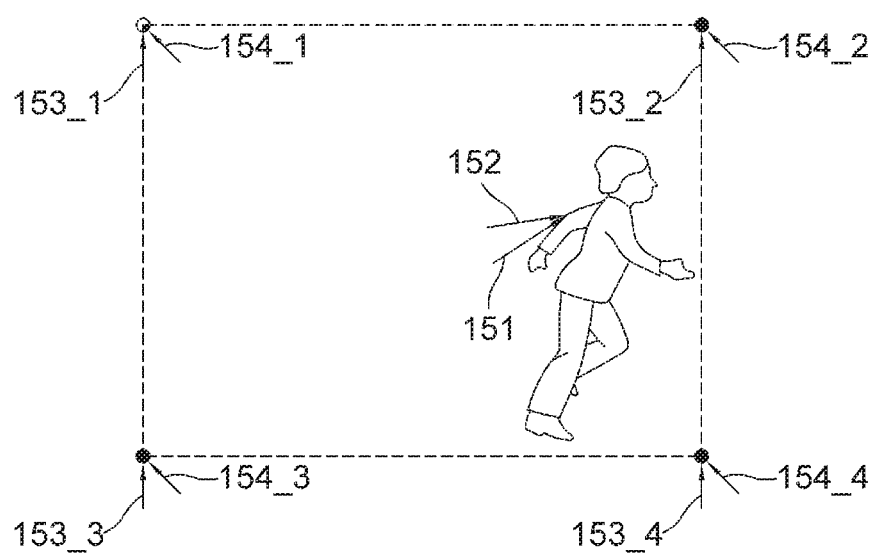
FIG. 4 is a drawing schematically illustrating an example of modeling optical flow vectors of a specific pixel, other than reference pixels, on a t-th image, for performing a method of removing jittering from the videos using the multiple neural networks in accordance with one example embodiment of the present disclosure.

FIG. 4 is a drawing schematically illustrating an example of modeling the optical flow vectors of a specific pixel, other than the reference pixels, on the t-th image, for performing a method of removing jittering from the videos using the multiple neural networks in accordance with one example embodiment of the present disclosure.

By referring to FIG. 4, a t-th optical flow vector 151 of the specific pixel corresponding to an arm of a human object may be modeled as comprised of a t-th object motion vector 152, t-th FPV vectors 153_1, 153_2, 153_3, and 153_4 of the reference pixels nearby the specific pixel, and t-th jittering vectors 154_1, 154_2, 154_3, and 154_4 of the reference pixels nearby the specific pixel. Herein, how much each of the t-th FPV vectors 153_1, 153_2, 153_3, and 153_4 and the t-th jittering vectors 154_1, 154_2, 154_3, and 154_4 will be reflected may be determined by weights $w_{ij,xy}$ in the sigma symbol. For example, the weights may be determined according to each of distances between the specific pixel and each of the reference pixels.

Under the assumption above, the vectors other than the t-th optical flow vectors may be optimized according to a formula below.

$$\min_{e,v,o} \sum_{i,j} \|e_{ij}^{(t)}\|_F^2 + \lambda_v \sum_{i,j} \|v_{ij}^{(t)} - v_{ij}^{(t-1)}\|_F^2 + \lambda_o \sum_{x,y} \|o_{xy}^{(t)} - o_{xy}^{(t-1)}\|_F^2$$

That is, under the assumption aforementioned, the t-th object motion vectors are optimized, and the t-th FPV vectors and the t-th jittering vectors are generated, by finding $e_{ij}^{(t)}$, $v_{ij}^{(t)}$, and $o_{xy}^{(t)}$ that minimize the formula above. The t-th object motion vectors may be optimized by adjustment using the formula above on a basis of the t-th object motion vectors generated by the 2-nd neural network 140.

In the formula above, $v_{ij}^{(t)}$ may be the (t−1)-th FPV vectors, $o_{xy}^{(t)}$ may be (t−1)-th object motion vectors, and $\lambda_v$ and $\lambda_o$ may be each of weights of $\Sigma_{i,j}\|v_{ij}^{(t)}-v_{ij}^{(t-1)}\|_F^2$ and $\Sigma_{x,y}\|o_{xy}^{(t)}-o_{xy}^{(t-1)}\|_F^2$, respectively. Herein, $\|e_{ij}^{(t)}\|_F^2$ may prevent a trivial solution and may maximize a quantity of information on vectors of movements other than jittering. The rest of the terms regulate the vectors such that the t-th FPV vectors and the t-th object motion vectors are not unrealistically larger than the (t−1)-th FPV vectors and the (t−1)-th object motion vectors, respectively. This is because the movements, i.e., motions, that are not jittering do not change too much during a small time range of a unit of one frame.

Another example embodiment of the optimization using another formula is described as follows.

$$\min_{e,v,o}\sum_{i,j}\|e_{ij}^{(t)}\|_F^2 + \frac{1}{\sum_{k=1,\ldots,K}w_k}\sum_{k=1,\ldots,K}w_k|v_{ij}^{(t)}-v_{ij}^{(t-k)}|^2 + \frac{1}{\sum_{k=1,\ldots,K}w_k}\sum_{k=1,\ldots,K}w_k|o_{xy}^{(t)}-o_{xy}^{(t-k)}|^2$$

The difference between the original formula and said another formula may be: the original formula utilizes information generated by referring to the (t−1)-th image corresponding to a frame right before the t-th frame, and said another formula in another example embodiment utilizes information generated by referring to images corresponding to previous K frames right before the t-th frame. Said another formula may play a role aforementioned, as $v_{ij}^{(t-k)}$ may be the (t−k)-th FPV vectors of a (t−k)-th image, and $o_{xy}^{(t-k)}$ may be (t−k)-th object motion vectors of the (t−k)-th image. $w_k$ may be weights of $|v_{ij}^{(t)}-v_{ij}^{(t-k)}|^2$ and $|o_{xy}^{(t)}-o_{xy}^{(t-k)}|^2$, and for example, it may be expressed as $$\exp\left(-\frac{k^2}{K^2}\right).$$

Using these processes, although computational load increases, the t-th object motion vectors may be optimized more finely, and the t-th FPV vectors and the t-th jittering vectors may be generated more accurately.

A t-th adjusted image in which jittering of the t-th image is smoothed may be generated by referring to the t-th jittering vectors created as such. For example, each of locations of each of the reference pixels may be displaced in an opposite direction and a same amplitude of its corresponding t-th jittering vector and each of images within the grid cells may be adjusted accordingly, and then jittering is smoothed and the t-th adjusted image may be generated.

The process of the optimization is described above, and the learning process of the 2-nd neural network 140 by using the losses that can be calculated during the optimization will be described.

In the process of the optimization, as aforementioned, the t-th object motion vectors may be optimized simultaneously when the t-th FPV vectors and the t-th jittering vectors are generated. Herein, the learning unit 160 may (i) acquire the optimized t-th object motion vectors from the jittering estimation unit 150, (ii) acquire from the 2-nd neural network 140 the t-th object motion vectors before the optimization, (iii) generate difference information on each of differences between each of the t-th object motion vectors before and after the optimization, and (iv) calculate the losses by referring to the difference information. Then, at least part of the parameters of the 2-nd neural network 140 may be learned by backpropagating the losses. The 1-st neural network 130 may have been learned as aforementioned and the jittering estimation unit 150 may use a preset formula, therefore no learning is required.

The learning method in accordance with one example of the present disclosure is described, and a testing process in accordance with one example of the present disclosure is described.

For reference, in the description below, the phrase "for training" or "training" is added for terms related to the learning process, and the phrase "for testing" or "testing" is added for terms related to the testing process, to avoid possible confusion.

On condition that a learning device has performed processes of (1) after acquiring a t-th image for training corresponding to a t-th frame for training on videos for training, instructing the 1-st neural network 130 to generate each of t-th masks for training corresponding to each of objects for training in the t-th image for training by applying the 1-st neural network operation to the t-th image for training, (2) instructing the 2-nd neural network 140 to generate each of t-th object motion vectors for training of each of object pixels for training, corresponding to each of the objects for training, included in the t-th image for training by applying the 2-nd neural network operation to (i) each of the t-th masks for training, (ii) each of t-th cropped images for training, corresponding to each of the t-th masks for training, which are part of the t-th image for training, (iii) each of (t−1)-th masks for training, and (iv) each of (t−1)-th cropped images for training, corresponding to each of the (t−1)-th masks for training, which are part of a (t−1)-th image for training, (3) instructing the jittering estimation unit 150 to generate each of t-th jittering vectors for training corresponding to each of reference pixels for training among pixels in the t-th image for training by referring to each of the t-th object motion vectors for training, and (4) instructing the learning unit 160 to calculate the losses by referring to (i) t-th adjusted object motion vectors for training optimized through a process for generating the t-th jittering vectors for training and (ii) the t-th object motion vectors for training before the optimization, and to learn at least part of the parameters of the 2-nd neural network 140 by backpropagating the losses, then if a t-th image for testing corresponding to a t-th frame for testing on videos for testing is acquired, a testing device may instruct the 1-st neural network to generate each of t-th masks for testing corresponding to each of objects for testing in the t-th image for testing by applying the 1-st neural network operation to the t-th image for testing.

Thereafter, the testing device may instruct the 2-nd neural network to generate each of t-th object motion vectors for testing of each of object pixels for testing, corresponding to each of the objects for testing, included in the t-th image for testing by applying the 2-nd neural network operation to (i) each of the t-th masks for testing, (ii) each of t-th cropped images for testing, corresponding to each of the t-th masks for testing, which are part of the t-th image for testing, (iii)

each of (t−1)-th masks for testing, and (iv) each of (t−1)-th cropped images for testing, corresponding to each of the (t−1)-th masks for testing, which are part of a (t−1)-th image for testing.

Then, the testing device may instruct the jittering estimation unit to generate each of t-th jittering vectors for testing corresponding to each of reference pixels for testing among pixels in the t-th image for testing by referring to each of the t-th object motion vectors for testing.

Further, the testing device may instruct the jittering estimation unit to generate a t-th adjusted image for testing in which jittering of the t-th image for testing is smoothed by referring to the t-th jittering vectors for testing.

Decent, stable, and corrected images without jitters are acquired from the shaking camera by performing a method for correcting images with jittering acquired from the shaking camera using the multiple neural networks in accordance with one example of the present disclosure.

The present disclosure has an effect of acquiring decent images from the shaking camera by providing a method for correcting images with jittering acquired from the shaking camera using the multiple neural networks.

The present disclosure has another effect of providing the multiple neural network having fault tolerance and fluctuation robustness in extreme situations.

Further, the method in accordance with the present disclosure can be used for video stabilization, object tracking with high precision, behavior estimation, motion decomposition, etc.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting jittering in videos generated by a shaking camera to remove the jittering on the videos using one or more neural networks, comprising steps of:
   (a) a computing device, if a t-th image corresponding to a t-th frame on the videos is acquired, instructing a 1-st neural network to generate each of t-th masks corresponding to each of objects in the t-th image by applying at least one 1-st neural network operation to the t-th image;
   (b) the computing device instructing a 2-nd neural network to generate each of t-th object motion vectors of each of object pixels, corresponding to each of the objects, included in the t-th image by applying at least one 2-nd neural network operation to (i) each of the t-th masks, (ii) each of t-th cropped images, corresponding to each of the t-th masks, which are part of the t-th image, (iii) each of (t−1)-th masks, and (iv) each of (t−1)-th cropped images, corresponding to each of the (t−1)-th masks, which are part of a (t−1)-th image; and
   (c) the computing device instructing a jittering estimation unit to generate each of t-th jittering vectors corresponding to each of reference pixels among pixels in the t-th image by referring to each of the t-th object motion vectors.

2. The method of claim 1, wherein the method further comprises a step of:
   (d) the computing device instructing the jittering estimation unit to generate a t-th adjusted image in which jittering of the t-th image is smoothed by referring to the t-th jittering vectors.

3. The method of claim 1, wherein the method further comprises a step of:
   (e) the computing device instructing a learning unit to calculate one or more losses by referring to (i) t-th adjusted object motion vectors optimized through a process for generating the t-th jittering vectors and (ii) the t-th object motion vectors before the optimization, and to learn at least part of one or more parameters of the 2-nd neural network by backpropagating the losses.

4. The method of claim 1, wherein, at the step of (c), the computing device instructs the jittering estimation unit to generate the t-th jittering vectors by further referring to (i) each of t-th optical flow vectors representing a degree of movement of each of positions corresponding to each of pixels in the t-th image between a point of time when the (t−1)-th image is taken and a point of time when the t-th image is taken by the camera and (ii) each of t-th FPV vectors representing a degree of movement of each of the positions in a three dimensional space between a point of time when the (t−1)-th image is taken and a point of time when the t-th image is taken by the camera.

5. The method of claim 4, wherein, at the step of (d), the computing device instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \lambda_v \sum_{i,j} \|v_{ij}^{(t)} - v_{ij}^{(t-1)}\|_F^2 + \lambda_o \sum_{x,y} \|o_{xy}^{(t)} - o_{xy}^{(t-1)}\|_F^2,$$

to thereby generate the t-th jittering vectors, wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-1)}$ is (t−1)-th FPV vectors, $o_{xy}^{(t-1)}$ is (t−1)-th object motion vectors, $\lambda_v$ and $\lambda_o$ are each of weights of $\Sigma_{i,j} \|v_{ij}^{(t)} - v_{ij}^{(t-1)}\|_F^2$ and $\Sigma_{x,y} \|o_{xy}^{(t)} - o_{xy}^{(t-1)}\|_F^2$ respectively, wherein i and x are integer values between 0 and W−1 wherein W is an integer value representing the number of pixels corresponding to a geometric horizontal length of the t-th frame;

wherein j and y are integer values between 0 and H−1 wherein H is an integer value representing the number of pixels corresponding to a geometric vertical length of the t-th frame, and wherein $\|\cdot\|_F$ is a Frobenius norm operation.

6. The method of claim 5, wherein the formula is valid for terms satisfying $$f_{ij}^{(t)} = o_{ij}^{(t)} + v_{ij}^{(t)} + e_{ij}^{(t)}, \quad f_{xy}^{(t)} = o_{xy}^{(t)} + \sum_{i,j \in NB(x,y)} w_{ij,xy}(v_{ij}^{(t)} + e_{ij}^{(t)})$$

wherein $f_{ij}^{(t)}$ is first t-th optical flow vectors, which are part of the t-th optical flow vectors, of the reference pixels, $f_{xy}^{(t)}$ is second t-th optical flow vectors of non-reference pixels other than the reference pixels, $o_{ij}^{(t)}$ is t-th object motion vectors, which are part of the t-th object motion vectors, of specific pixels which are the object pixels and also the reference pixels, i,j∈NB (x,y) at a bottom of a sigma symbol represents that information on part of the reference pixels in a certain grid NB(x,y), among the grids generated on the t-th frame, including a certain pixel (x,y) among the non-reference pixels, is used, and $w_{ij,xy}$ is each of weights according to at least one location of the certain pixel in the grid.

7. The method of claim 4, wherein the computing device instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \frac{1}{\sum_{k=1,\ldots,K} w_k} \sum_{k=1,\ldots,K} w_k |v_{ij}^{(t)} - v_{ij}^{(t-k)}|^2 + \frac{1}{\sum_{k=1,\ldots,K} w_k} \sum_{k=1,\ldots,K} w_k |o_{xy}^{(t)} - o_{xy}^{(t-k)}|^2$$

wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-k)}$ is (t−k)-th FPV vectors of a (t−k)-th image, $o_{xy}^{(t-k)}$ is (t−k)-th object motion vectors of the (t−k)-th image, $w_k$ is weights of $|v_{ij}^{(t)} - v_{ij}^{(t-k)}|^2$ and $|o_{xy}^{(t)} - o_{xy}^{(t-k)}|^2$, K is a certain constant, wherein i and x are integer values between 0 and W−1 wherein W is an integer value representing the number of pixels corresponding to a geometric horizontal length of the t-th frame;

wherein j and y are integer values between 0 and H−1 wherein H is an integer value representing the number of pixels corresponding to a geometric vertical length of the t-th frame, and wherein $\|\cdot\|_F$ is a Frobenius norm operation.

8. The method of claim 1, wherein, at the step of (b), the 2-nd neural network includes a (2_1)-st neural network and a (2_2)-nd neural network, wherein the (2_1)-st neural network generates at least one intermediate feature map by performing at least one (2_1)-st neural network operation, included in the 2-nd neural network operation, which analyzes each of the t-th masks, each of the t-th cropped images, each of the (t−1)-th masks and each of the (t_1)-st cropped images, and wherein the (2_2)-nd neural network generates the t-th object motion vectors by applying at least one (2_2)-nd neural network operation included in the 2-nd neural network operation to the intermediate feature map by referring to analysis of values inputted before acquiring the t-th image.

9. The method of claim 8, wherein the (2_2)-nd neural network generates the t-th object motion vectors using its stored state vectors, by reflecting the analysis of values, generated by the (2_1)-st neural network, on at least part of a 1-st image to the (t−1)-th image and updates the state vectors.

10. The method of claim 1, wherein the reference pixels are vertices disposed on boundaries of a grid cell of the grid on the t-th image.

11. The method of claim 1, wherein, at the step of (a), the 1-st neural network includes at least one Region Proposal Network, at least one convolutional layer, at least one pooling layer, and wherein if the Region Proposal Network generates at least one ROI, the 1-st neural network selects at least one region, corresponding to the ROI, on the t-th image by a bilinear interpolation and generates the t-th masks by applying at least one operation of the convolutional layer to said at least one region.

12. A testing method for removing jittering in videos for testing generated by a shaking camera to remove the jittering on the videos for testing using one or more neural networks, comprising steps of:

(a) a testing device, on condition that a learning device has performed processes of (1) after acquiring a t-th image for training corresponding to a t-th frame for training on videos for training, instructing a 1-st neural network to generate each of t-th masks for training corresponding to each of objects for training in the t-th image for training by applying at least one 1-st neural network operation to the t-th image for training, (2) instructing a 2-nd neural network to generate each of t-th object motion vectors for training of each of object pixels for training, corresponding to each of the objects for training, included in the t-th image for training by applying at least one 2-nd neural network operation to (i) each of the t-th masks for training, (ii) each of t-th cropped images for training, corresponding to each of the t-th masks for training, which are part of the t-th image for training, (iii) each of (t−1)-th masks for training, and (iv) each of (t−1)-th cropped images for training, corresponding to each of the (t−1)-th masks for training, which are part of a (t−1)-th image for training, (3) instructing a jittering estimation unit to generate each of t-th jittering vectors for training corresponding to each of reference pixels for training among pixels in the t-th image for training by referring to each of the t-th object motion vectors for training, and (4) instructing a learning unit to calculate one or more losses by referring to (i) t-th adjusted object motion vectors for training optimized through a process for generating the t-th jittering vectors for training and (ii) the t-th object motion vectors for training before the optimization, and to learn at least part of one or more parameters of the 2-nd neural network by backpropagating the losses; if a t-th image for testing corresponding to a t-th frame for testing on the videos for testing is acquired, instructing the 1-st neural network to generate each of t-th masks for testing corresponding to each of objects for testing in the t-th image for testing by applying the 1-st neural network operation to the t-th image for testing;

(b) the testing device instructing the 2-nd neural network to generate each of t-th object motion vectors for testing of each of object pixels for testing, corresponding to each of the objects for testing, included in the t-th image for testing by applying the 2-nd neural network operation to (i) each of the t-th masks for testing, (ii) each of t-th cropped images for testing, corresponding to each of the t-th masks for testing, which are part of the t-th image for testing, (iii) each of (t−1)-th masks for testing, and (iv) each of (t−1)-th cropped images for testing, corresponding to each of the (t−1)-th masks for testing, which are part of a (t−1)-th image for testing; and (c) the testing device instructing the jittering estimation unit to generate each of t-th jittering vectors for testing corresponding to each of reference pixels for testing among pixels in the t-th image for testing by referring to each of the t-th object motion vectors for testing.

13. The testing method of claim 12, wherein the testing method further comprises a step of:

(d) the testing device instructing the jittering estimation unit to generate a t-th adjusted image for testing in which jittering of the t-th image for testing is smoothed by referring to the t-th jittering vectors for testing.

14. A computing device for detecting jittering in videos generated by a shaking camera to remove the jittering on the videos using one or more neural networks, comprising:

at least one memory that stores instructions; and
at least one processor configured to execute the instructions to: perform processes of: (I) if a t-th image corresponding to a t-th frame on the videos is acquired, instructing a 1-st neural network to generate each of t-th masks corresponding to each of objects in the t-th image by applying at least one 1-st neural network operation to the t-th image, (II) instructing a 2-nd neural network to generate each of t-th object motion vectors of each of object pixels, corresponding to each of the objects, included in the t-th image by applying at least one 2-nd neural network operation to (i) each of the t-th masks, (ii) each of t-th cropped images, corresponding to each of the t-th masks, which are part of the t-th image, (iii) each of (t−1)-th masks, and (iv) each of (t−1)-th cropped images, corresponding to each of the (t−1)-th masks, which are part of a (t−1)-th image, and (III) instructing a jittering estimation unit to generate each of t-th jittering vectors corresponding to each of reference pixels among pixels in the t-th image by referring to each of the t-th object motion vectors.

15. The computing device of claim 14, wherein the processor further performs a process of:

(IV) instructing the jittering estimation unit to generate a t-th adjusted image in which jittering of the t-th image is smoothed by referring to the t-th jittering vectors.

16. The computing device of claim 14, wherein the processor further performs a process of:

(V) instructing a learning unit to calculate one or more losses by referring to (i) t-th adjusted object motion vectors optimized through a process for generating the t-th jittering vectors and (ii) the t-th object motion vectors before the optimization, and to learn at least part of one or more parameters of the 2-nd neural network by backpropagating the losses.

17. The computing device of claim 14, wherein, at the process of (III), the processor instructs the jittering estimation unit to generate the t-th jittering vectors by further referring to (i) each of t-th optical flow vectors representing a degree of movement of each of positions corresponding to each of pixels in the t-th image between a point of time when the (t−1)-th image is taken and a point of time when the t-th image is taken by the camera and (ii) each of t-th FPV vectors representing a degree of movement of each of the positions in a three dimensional space between a point of time when the (t−1)-th image is taken and a point of time when the t-th image is taken by the camera.

18. The computing device of claim 17, wherein, at the process of (IV), the processor instructs the jittering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \lambda_v \sum_{i,j} \|v_{ij}^{(t)} - v_{ij}^{(t-1)}\|_F^2 + \lambda_o \sum_{x,y} \|o_{xy}^{(t)} - o_{xy}^{(t-1)}\|_F^2,$$

to thereby generate the t-th jittering vectors, wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-1)}$ is (t−1)-th FPV vectors, $o_{xy}^{(t-1)}$ is (t−1)-th object motion vectors, $\lambda_v$ and $\lambda_o$ are each of weights of $\Sigma_{i,j}\|v_{ij}^{(t)} - v_{ij}^{(t-1)}\|_F^2$ and $\Sigma_{x,y}\|o_{xy}^{(t)} - o_{xy}^{(t-1)}\|_F^2$ respectively, wherein i and x are integer values between 0 and W−1 wherein W is an integer value representing the number of pixels corresponding to a geometric horizontal length of the t-th frame;

wherein j and y are integer values between 0 and H−1 wherein H is an integer value representing the number of pixels corresponding to a geometric vertical length of the t-th frame, and wherein $\|.\|_F$ is a Frobenius norm operation.

19. The computing device of claim 18, wherein the formula is valid for terms satisfying $$f_{ij}^{(t)} = o_{ij}^{(t)} + v_{ij}^{(t)} + e_{ij}^{(t)}, f_{xy}^{(t)} = o_{xy}^{(t)} + \sum_{i,j \in NB(x,y)} w_{ij,xy}(v_{ij}^{(t)} + e_{ij}^{(t)})$$

wherein $f_{ij}^{(t)}$ is first t-th optical flow vectors, which are part of the t-th optical flow vectors, of the reference pixels, $f_{xy}^{(t)}$ is second t-th optical flow vectors of pixels other than the reference pixels, $o_{ij}^{(t)}$ is t-th object motion vectors, which are part of the t-th object motion vectors, of specific pixels which are the object pixels and also the reference pixels, i,j∈NB(x,y) at a bottom of a sigma symbol represents that information on part of the reference pixels in a certain grid NB(x,y), among the grids generated on the t-th frame, including a certain pixel (x,y) among the non-reference pixels, is used, and $w_{ij,xy}$ is each of weights according to at least one location of the certain pixel in the grid.

20. The computing device of claim 17, wherein the processor instructs the uttering estimation unit to calculate $e_{ij}^{(t)}$, $v_{ij}^{(t)}$, and $o_{xy}^{(t)}$ which minimize a formula:

$$\sum_{i,j} \|e_{ij}^{(t)}\|_F^2 + \frac{1}{\sum_{k=1,\ldots,K} w_k} \sum_{k=1,\ldots,K} w_k |v_{ij}^{(t)} - v_{ij}^{(t-k)}|^2 +$$

-continued $$\frac{1}{\sum_{k=1,\ldots,K} w_k} \sum_{k=1,\ldots,K} w_k |o_{xy}^{(t)} - o_{xy}^{(t-k)}|^2$$

wherein $e_{ij}^{(t)}$ is the t-th jittering vectors, $v_{ij}^{(t)}$ is the t-th FPV vectors, $o_{xy}^{(t)}$ is the t-th object motion vectors, $v_{ij}^{(t-k)}$ is (t−k)-th FPV vectors of a (t−k)-th image, $o_{xy}^{(t-k)}$ is (t−k)-th object motion vectors of the (t−k)-th image, $w_k$ is weights of $|v_{ij}^{(t)} - v_{ij}^{(t-k)}|^2$ and $|o_{xy}^{(t)} - o_{xy}^{(t-k)}|^2$, K is a certain constant, wherein i and x are integer values between 0 and W−1 wherein W is an integer value representing the number of pixels corresponding to a geometric horizontal length of the t-th frame;

wherein j and y are integer values between 0 and H−1 wherein H is an integer value representing the number of pixels corresponding to a geometric vertical length of the t-th frame, and wherein $\|.\|_F$ is a Frobenius norm operation.

21. The computing device of claim 14, wherein, at the process of (II), the 2-nd neural network includes a (2_1)-st neural network and a (2_2)-nd neural network, wherein the (2_1)-st neural network generates at least one intermediate feature map by performing at least one (2_1)-st neural network operation, included in the 2-nd neural network operation, which analyzes each of the t-th masks, each of the t-th cropped images, each of the (t−1)-th masks and each of the (t_1)-st cropped images, and wherein the (2_2)-nd neural network generates the t-th object motion vectors by applying at least one (2_2)-nd neural network operation included in the 2-nd neural network operation to the intermediate feature map by referring to analysis of values inputted before acquiring the t-th image.

22. The computing device of claim 21, wherein the (2_2)-nd neural network generates the t-th object motion vectors using its stored state vectors, by reflecting the analysis of values, generated by the (2_1)-st neural network, on at least part of a 1-st image to the (t−1)-th image and updates the state vectors.

23. The computing device of claim 14, wherein the reference pixels are vertices disposed on boundaries of a grid cell of the grid on the t-th image.

24. The computing device of claim 14, wherein, at the process of (I), the 1-st neural network includes at least one Region Proposal Network, at least one convolutional layer, at least one pooling layer, and wherein if the Region Proposal Network generates at least one ROI, the 1-st neural network selects at least one region, corresponding to the ROI, on the t-th image by a bilinear interpolation and generates the t-th masks by applying at least one operation of the convolutional layer to said at least one region.

25. A testing device for removing jittering in videos for testing generated by a shaking camera to remove the jittering on the videos for testing using one or more neural networks, comprising:

at least one memory that stores instructions; and
at least one processor, on condition that a learning device has performed processes of (1) after acquiring a t-th image for training corresponding to a t-th frame for training on videos for training, instructing a 1-st neural network to generate each of t-th masks for training corresponding to each of objects for training in the t-th image for training by applying at least one 1-st neural network operation to the t-th image for training, (2) instructing a 2-nd neural network to generate each of t-th object motion vectors for training of each of object pixels for training, corresponding to each of the objects for training, included in the t-th image for training by applying at least one 2-nd neural network operation to (i) each of the t-th masks for training, (ii) each of t-th cropped images for training, corresponding to each of the t-th masks for training, which are part of the t-th image for training, (iii) each of (t−1)-th masks for training, and (iv) each of (t−1)-th cropped images for training, corresponding to each of the (t−1)-th masks for training, which are part of a (t−1)-th image for training, (3) instructing a jittering estimation unit to generate each of t-th jittering vectors for training corresponding to each of reference pixels for training among pixels in the t-th image for training by referring to each of the t-th object motion vectors for training, and (4) instructing a learning unit to calculate one or more losses by referring to (i) t-th adjusted object motion vectors for training optimized through a process for generating the t-th jittering vectors for training and (ii) the t-th object motion vectors for training before the optimization, and to learn at least part of one or more parameters of the 2-nd neural network by backpropagating the losses; configured to execute the instructions to: perform processes of: (I) if a t-th image for testing corresponding to a t-th frame for testing on the videos for testing is acquired, instructing the 1-st neural network to generate each of t-th masks for testing corresponding to each of objects for testing in the t-th image for testing by applying the 1-st neural network operation to the t-th image for testing, (II) instructing the 2-nd neural network to generate each of t-th object motion vectors for testing of each of object pixels for testing, corresponding to each of the objects for testing, included in the t-th image for testing by applying the 2-nd neural network operation to (i) each of the t-th masks for testing, (ii) each of t-th cropped images for testing, corresponding to each of the t-th masks for testing, which are part of the t-th image for testing, (iii) each of (t−1)-th masks for testing, and (iv) each of (t−1)-th cropped images for testing, corresponding to each of the (t−1)-th masks for testing, which are part of a (t−1)-th image for testing; and (III) instructing the jittering estimation unit to generate each of t-th jittering vectors for testing corresponding to each of reference pixels for testing among pixels in the t-th image for testing by referring to each of the t-th object motion vectors for testing.

26. The testing device of claim 25, wherein the processor further performs a process of:

(IV) instructing the jittering estimation unit to generate a t-th adjusted image for testing in which jittering of the t-th image for testing is smoothed by referring to the t-th jittering vectors for testing.

* * * * *